US008444952B2

(12) United States Patent
Dodin et al.

(10) Patent No.: US 8,444,952 B2
(45) Date of Patent: May 21, 2013

(54) IM-20 CRYSTALLINE SOLID AND PROCESS FOR ITS PREPARATION

(75) Inventors: Mathias Dodin, Mulhouse (FR); Yannick Lorgouilloux, Limoges (FR); Jean-Louis Paillaud, Mulhouse (FR); Philippe Caullet, Illzach (FR); Joel Patarin, Flaxlanden (FR); Nicolas Bats, Saint Symphorien d'Ozon (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 0 days.

(21) Appl. No.: 13/140,501

(22) PCT Filed: Nov. 26, 2009

(86) PCT No.: PCT/FR2009/001347
§ 371 (c)(1),
(2), (4) Date: Sep. 22, 2011

(87) PCT Pub. No.: WO2010/076399
PCT Pub. Date: Jul. 8, 2010

(65) Prior Publication Data
US 2012/0041210 A1 Feb. 16, 2012

(30) Foreign Application Priority Data
Dec. 18, 2008 (FR) .................................. 08 07271

(51) Int. Cl.
*C01B 39/46* (2006.01)
*C01B 39/48* (2006.01)
*B01J 20/18* (2006.01)
*B01D 15/00* (2006.01)
*B01D 53/14* (2006.01)

(52) U.S. Cl.
USPC ............. 423/718; 423/706; 502/60; 502/62; 210/660; 95/90

(58) Field of Classification Search
USPC ..... 423/706, 718; 502/60, 62; 210/660; 95/90
See application file for complete search history.

(56) References Cited

U.S. PATENT DOCUMENTS 5,173,281 A * 12/1992 Chang et al. .................. 423/702
5,779,882 A * 7/1998 Chester et al. ........... 208/120.01
(Continued)

FOREIGN PATENT DOCUMENTS
EP     1 518 827 A1    3/2005

OTHER PUBLICATIONS

Adams, C.J., et al, "Rapid Communication: The Synthesis of Mesoporous Materials Using Novel Ionic Liquid Templates in Water," Australian Journal of Chemistry, [Online] URL: http://www.publish.csiro.au/paper/CH01191htm>: abstract; retrieved from the internet on Sep. 10, 2009; Cited in International Search Report, dated Apr. 29, 2010, issued in corresponding PCT/FR2009/001347.

(Continued)

*Primary Examiner* — David M Brunsman
(74) *Attorney, Agent, or Firm* — Millen, White, Zelano & Branigan, P.C.

(57) ABSTRACT

The invention concerns a crystalline solid designated IM-20 which has the X-ray diffraction diagram given below. Said solid has a chemical composition expressed by the empirical formula: $mXO_2$: $nGeO_2$: $pZ_2O_3$: $qR$: $sF$: $wH_2O$, in which R represents one or more organic species, X represents one or more tetravalent element(s) other than germanium, Z represents at least one trivalent element and F is fluorine.

10 Claims, 2 Drawing Sheets

U.S. PATENT DOCUMENTS

| | | | |
|---|---|---|---|
| 6,034,179 A * | 3/2000 | Feng et al. | 525/106 |
| 6,136,290 A * | 10/2000 | Benazzi et al. | 423/705 |
| 6,555,089 B1 * | 4/2003 | Elomari | 423/706 |
| 6,569,401 B1 * | 5/2003 | Elomari | 423/718 |
| 6,652,831 B1 * | 11/2003 | Villaescusa Alonso et al. | 423/706 |
| 7,074,385 B2 * | 7/2006 | Harbuzaru et al. | 423/718 |
| 7,108,843 B2 * | 9/2006 | Zones et al. | 423/718 |
| 7,820,141 B2 * | 10/2010 | Burton, Jr. | 423/704 |
| 8,025,864 B2 * | 9/2011 | Corma et al. | 423/718 |
| 2005/0067604 A1 * | 3/2005 | Harbuzaru et al. | 252/62 |
| 2006/0159615 A1 * | 7/2006 | Jan et al. | 423/718 |
| 2008/0045768 A1 * | 2/2008 | Roth et al. | 585/899 |
| 2010/0119739 A1 * | 5/2010 | Beck et al. | 428/32.51 |
| 2011/0166401 A1 * | 7/2011 | Roth et al. | 585/422 |
| 2011/0166402 A1 * | 7/2011 | Roth et al. | 585/422 |
| 2011/0190114 A1 * | 8/2011 | Roth et al. | 502/60 |
| 2012/0004484 A1 * | 1/2012 | Lewis et al. | 585/446 |

OTHER PUBLICATIONS

Trewyn, B., et al., "Morphological Control of Room-Temperature Ionic Liquid Templated Mesoporous Silica Nanoparticles for Controlled Release of Antibacterial Agents," Nano Letters, Sep. 28, 2004, vol. 4, No. 11, pp. 2139-2143; Cited in International Search Report, dated Apr. 29, 2010, issued in corresponding PCT/FR20091001347.

Aslanov, L.A., et al., "Preparation of Mesoporous Aluminium Hydroxide and Oxide in Ionic Liquids," Russian Journal of Inorganic Chemistry, Oct. 2007, vol. 52, No. 10, pp. 1511-1513, Pleiades Publishing, Inc.; Cited in International Search Report, dated Apr. 29, 2010, issued in corresponding PCT/FR2009/001347.

Mathieu, Yannick. et al., "Synthesis and characterization of IM-10: a new microporous silicogermanate with a novel topology," Microporous and Mesoporous Materials, Oct. 12, 2007, vol. 75, No. 1-2, pp. 13-22, Elsevier; Cited in International Search Report, dated Apr. 29, 2010, issued in corresponding PCT/FR2009/001347.

Corma, A., et al., "A large-cavity zeolite with wide pore windows and potential as an oil refining catalyst," Nature, Aug. 2002, vol. 418, p. 514-517, Nature Publishing Group, 2002; Cited in International Search Report, dated Apr. 29, 2010, issued in corresponding PCTIFR2009/001347.

Tang, L., et al., SU-21, A layered silicogermanate with organic amines covalently-bonded to germanium," Microporous and Mesoporous Materials," Apr. 2007, vol. 101. No. 1-2, pp. 24-29, Elsevier; Cited in International Search Report, dated Apr. 29, 2010, issued in corresponding PCT/FR2009/001347.

Li, H., et al., "Transformation of Germanium Dioxide to Microporous Germanate 4-Connected Nets," J. Am. Chem. Soc., 1998, vol. 120, No. 40, pp. 10569-10570; Cited in International Search Report, dated Apr. 29, 2010, issued in corresponding PCT/FR2009/001347.

Villaescusa, L.A., et al., "ITQ-7: A new pure silica polymorph with a three-dimensional system of large pore channels," Angew.Chem. Int. Ed., Jul. 12, 1999 vol. 38, No. 13-14, pp. 1997-2000; Cited in International Search Report, dated Apr. 29, 2010, issued in corresponding PCT/FR2009/001347.

International Search Report, dated Apr. 29, 2010, issued in corresponding PCT/FR2009/001347.

Written Opinion, dated Apr. 29, 2010, issued in corresponding PCT/FR2009/001347.

* cited by examiner

IM-20 CRYSTALLINE SOLID AND PROCESS FOR ITS PREPARATION

This application is a 371 of PCT/FR2009/001347 filed Nov. 26, 2009.

TECHNICAL FIELD

The present invention relates to a novel crystalline solid hereinafter termed IM-20, having a novel crystalline structure, and to a process for preparing said solid.

PRIOR ART

During the past few years, the search for novel molecular sieves has led to the synthesis of a wide variety of this class of products. A wide variety of aluminosilicates with a zeolitic structure characterized in particular by their chemical composition, the diameter of the pores they contain, and the shape and geometry of their microporous system has thus been developed.

Of the zeolites synthesized over the last forty years, a certain number of solids have allowed significant progress to be made in the fields of adsorption and catalysis. Examples of these which may be cited are Y zeolite (U.S. Pat. No. 3,130,007) and ZSM-5 zeolite (U.S. Pat. No. 3,702,886). The number of novel molecular sieves, including zeolites, synthesized each year is constantly increasing. A more complete description of the various molecular sieves which have been discovered can be obtained by referring to the following work: "Atlas of Zeolite Framework Types", Ch Baerlocher, W M Meier and D H Olson, Fifth Revised Edition, 2001, Elsevier. The following may be cited: NU-87 zeolite (U.S. Pat. No. 5,178,748), MCM-22 zeolite (U.S. Pat. No. 4,954,325) or gallophosphate (cloverite) with structure type CLO (U.S. Pat. No. 5,420,279) or the following zeolites: ITQ-12 (U.S. Pat. No. 6,471,939), ITQ-13 (U.S. Pat. No. 6,471,941), CIT-5 (U.S. Pat. No. 6,043,179), ITQ-21 (WO-02/092511), ITQ-22 (Comm A et al, Nature Materials 2003, 2, 493), SSZ-53 (Burton A et al, Chemistry: A Eur. Journal 2003, 9, 5737), SSZ-59 (Burton A et al, Chemistry: A Eur. Journal 2003, 9, 5737), SSZ-58 (Burton A et al, J Am Chem Soc 2003, 125, 1633) and UZM-5 (Blackwell, C S et al, Angew Chem, Int Ed, 2003, 42, 1737).

Several of the zeolites cited above have been synthesized in a fluoride medium, in which the mobilizing agent is not the usual hydroxide ion but the fluoride ion, using a process initially described by Flanigen et al (U.S. Pat. No. 4,073,865) then developed by J-L Guth et al (Proc Int Zeol Conf Tokyo 1986, p 121). The pHs of the synthesis media are typically close to neutrality. One of the advantages of such fluorinated reaction systems is that it allows purely silicic zeolites containing fewer defects to be obtained than with zeolites obtained in the traditional OH⁻ medium (J M Chézeau et al, Zeolites, 1991, 11, 598). Another decisive advantage linked to the use of fluorinated reaction media is that novel topologies for the silicic framework containing double rings with four tetrahedra (D4R) can be obtained, as is the case for ITQ-7, ITQ-12 and ITQ-13 zeolites. Further, the joint use of sources of germanium and silicon in the synthesis media may also allow novel frameworks of that type to be produced, i.e. containing D4R units, both in a conventional non-fluorinated basic medium and in a fluorinated medium, as is the ease for ITQ-17 and ITQ-21 zeolites (A Corma et al, Chem Commun 2001, 16, 1486, Chem Commun 2003, 9, 1050) or IM-12 (J-L Paillaud et al, Science, 2004, 304, 990).

DESCRIPTION OF THE INVENTION

The present invention concerns a novel crystalline solid, termed an IM-20 crystalline solid, having a novel crystalline structure. Said solid has a chemical composition expressed by the following general formula: $mXO_2: nGeO_2: pZ_2O_3: qR: sF: wH_2O$, in which R represents one or more organic species, X represents one or more tetravalent element(s) other than germanium, Z represents at least one trivalent element and F is fluorine, m, n, p, q, s and w respectively representing the number of moles of $XO_2$, $GeO_2$, $Z_2O_3$, R, F and $H_2O$ and m is in the range 0.3 to 0.8, n is in the range 0.2 to 0.7, p is in the range 0 to 0.1, q is in the range 0 to 0.2, s is in the range 0 to 0.2 and w is in the range 0 to 1.

In its as-synthesized form, the IM-20 crystalline solid of the invention has an X-ray diffraction diagram which includes at least the peaks set out in Table 1. In its calcined form, the IM-20 crystalline solid of the invention has an X-ray diffraction diagram which includes at least the peaks set out in Table 2. This novel IM-20 crystalline solid has a novel crystalline structure.

These diffraction diagrams are obtained by radiocrystallographic analysis using a diffractometer employing the conventional powder technique with the $K_{\alpha 1}$ peak of copper ($\lambda=1.5406$ Å). From the position of the diffraction peaks represented by the angle 2θ, the characteristic interplanar spacings $d_{hkl}$ of the sample are calculated using the Bragg relationship. The error estimation $\Delta(d_{hkl})$ in the measurement of $d_{hkl}$ is calculated by the Bragg relationship as a function of the absolute error $\Delta(2\theta)$ in the measurement of 2θ. An absolute error $\Delta(2\theta)$ of ±0.02° is normally acceptable. The relative intensity $I/I_0$ in each value of $d_{hkl}$ is measured from the height of the corresponding diffraction peak. The X-ray diffraction diagram of the IM-20 crystalline solid of the invention in its as-synthesized form comprises at least the peaks at values of $d_{hkl}$ given in Table 1. The X-ray diffraction diagram of the IM-20 crystalline solid of the invention in its calcined form comprises at least the peaks at values of $d_{hkl}$ given in Table 2. In the $d_{hkl}$ column, the mean values of the interplanar spacings are indicated in Angstroms (Å). Each of these values must be supplemented by an error measurement $\Delta(d_{hkl})$ between ±0.2 Å and ±0.003 Å.

TABLE 1

Mean values of $d_{hkl}$ and relative intensities, measured on an X-ray diffraction diagram, of the as-synthesized IM-20 crystalline solid

| 2 theta (°) | $d_{hkl}$ (Å) | $I/I_0$ |
| --- | --- | --- |
| 3.49 | 25.32 | Vw |
| 6.93 | 12.75 | Vs |
| 6.99 | 12.64 | Vs |
| 7.61 | 11.61 | Mw |
| 7.76 | 11.39 | W |
| 9.85 | 8.97 | Mw |
| 10.30 | 8.59 | M |
| 10.87 | 8.13 | Mw |
| 12.46 | 7.10 | W |
| 12.98 | 6.81 | Vw |
| 17.57 | 5.04 | Vw |
| 19.79 | 4.48 | Vw |
| 20.69 | 4.29 | W |
| 20.79 | 4.27 | W |
| 21.13 | 4.20 | Vw |
| 22.06 | 4.03 | W |
| 22.27 | 3.99 | Mw |
| 22.52 | 3.94 | W |
| 22.99 | 3.87 | M |
| 23.36 | 3.80 | Mw |
| 23.54 | 3.78 | Vw |

TABLE 1-continued

Mean values of $d_{hkl}$ and relative intensities, measured on an X-ray diffraction diagram, of the as-synthesized IM-20 crystalline solid

| 2 theta (°) | $d_{hkl}$ (Å) | $I/I_0$ |
|---|---|---|
| 24.06 | 3.70 | Mw |
| 24.29 | 3.66 | Vw |
| 24.70 | 3.60 | M |
| 25.08 | 3.55 | Vw |
| 25.33 | 3.51 | Vw |
| 25.87 | 3.44 | Vw |
| 26.95 | 3.31 | Vw |
| 27.98 | 3.19 | Vw |
| 28.45 | 3.13 | Vw |
| 32.43 | 2.76 | Vw |
| 33.97 | 2.64 | vw |

TABLE 2

Mean values of $d_{hkl}$ and relative intensities, measured on an X-ray diffraction diagram, of the calcined IM-20 crystalline solid

| 2 theta (°) | $d_{hkl}$ (Å) | $I/I_0$ |
|---|---|---|
| 3.49 | 25.27 | Vw |
| 6.95 | 12.72 | Vs |
| 7.02 | 12.59 | S |
| 7.63 | 11.58 | W |
| 7.79 | 11.34 | Vw |
| 8.38 | 10.54 | Vw |
| 9.87 | 8.95 | Vw |
| 10.32 | 8.56 | W |
| 10.90 | 8.11 | W |
| 12.47 | 7.09 | Vw |
| 12.98 | 6.81 | Vw |
| 13.91 | 6.36 | Vw |
| 14.05 | 6.30 | Vw |
| 15.27 | 5.80 | Vw |
| 15.89 | 5.57 | Vw |
| 17.59 | 5.04 | Vw |
| 18.21 | 4.87 | Vw |
| 19.82 | 4.48 | Vw |
| 20.70 | 4.29 | Vw |
| 21.15 | 4.20 | Vw |
| 22.10 | 4.02 | Vw |
| 22.32 | 3.98 | W |
| 22.57 | 3.94 | Vw |
| 22.99 | 3.86 | Vw |
| 23.39 | 3.80 | Vw |
| 24.05 | 3.70 | Vw |
| 24.30 | 3.66 | Vw |
| 24.70 | 3.60 | Vw |
| 25.10 | 3.54 | Vw |
| 25.30 | 3.52 | Vw |
| 28.05 | 3.18 | Vw |
| 28.67 | 3.11 | vw | in which: Vs=very strong; S=strong; M=medium; Mw=medium weak; W=weak; Vw=very weak.

The relative intensity $I/I_0$ is given with respect to a relative intensity scale where a value of 100 is attributed to the most intense peak in the X-ray diffraction diagram: Vw<15; $15 \leq W<30$; $30 \leq Mw<50$; $50 \leq M<65$; $65 \leq S<85$; $Vs \geq 85$.

BRIEF DESCRIPTION OF THE DRAWINGS

The IM-20 crystalline solid of the invention has a novel basic crystalline structure or topology which is characterized by its X-ray diffraction diagram in FIG. 1.

Said solid IM-20 has a chemical composition defined by the following general formula: $mXO_2: nGeO_2: pZ_2O_3: sF: wH_2O$, in which R represents one or more organic species, X represents one or more tetravalent elements) other than germanium, Z represents at least one trivalent element and F is fluorine. In formula (I), m, n, p, q, s and w respectively represent the number of moles of $XO_2$, $GeO_2$, $Z_2O_3$, R, F and $H_2O$ and m is in the range 0.3 to 0.8, n is in the range 0.2 to 0.7, p is in the range 0 to 0.1, q is in the range 0 to 0.2, s is in the range 0 to 0.2 and w is in the range 0 to 1.

Figure 1:
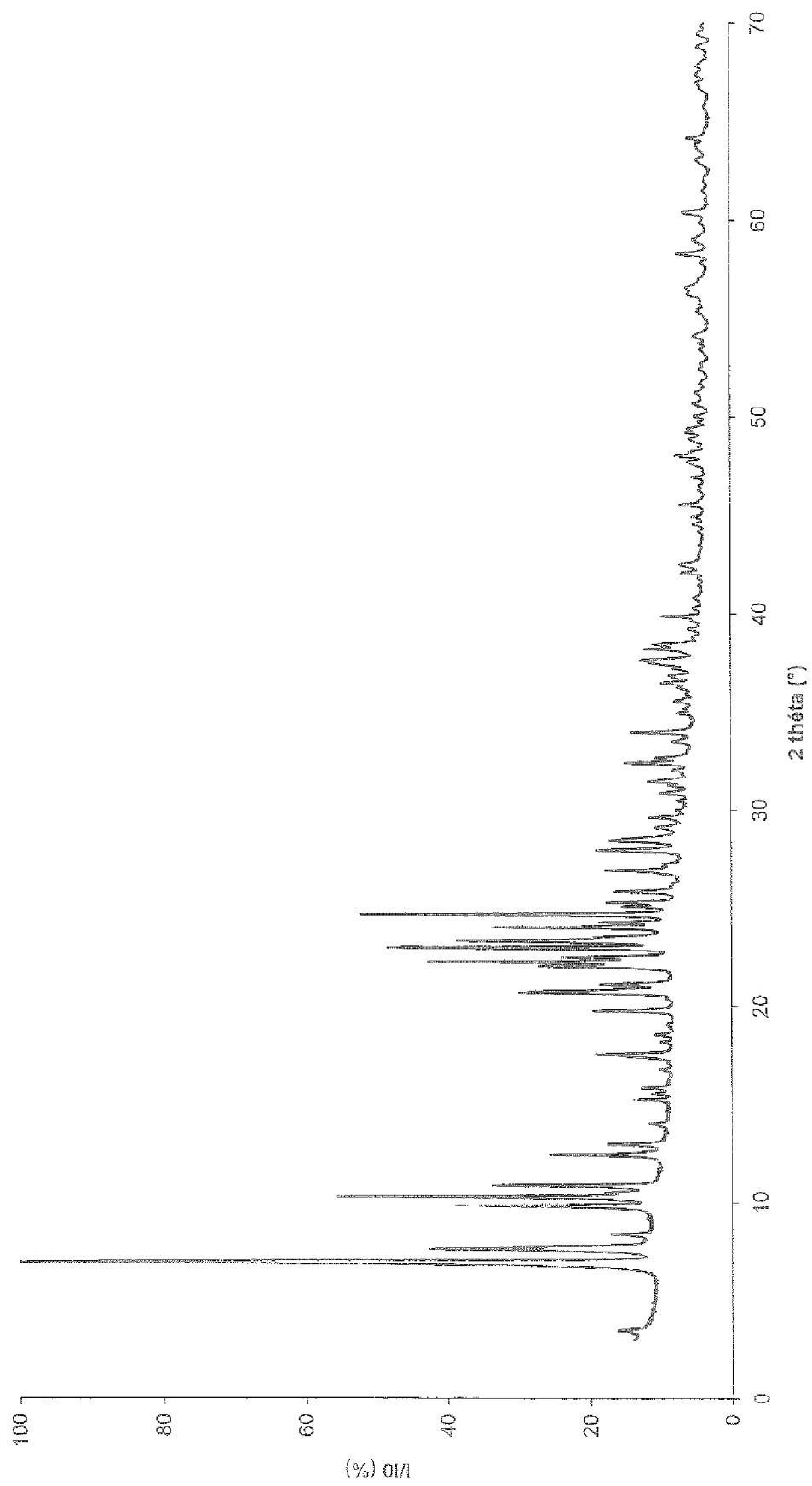

Advantageously, the molar ratio m/n of the IM-20 crystalline solid of the invention is in the range 1 to 10, preferably in the range 1 to 5 and highly preferably in the range 1.5 to 2. The molar ratio $\{(n+m)/p\}$ is 10 or more and is preferably 20 or more. The value of p is in the range 0 to 0.1, more preferably in the range 0 to 0.05 and even more preferably in the range 0.005 to 0.02. The value of q is in the range 0 to 0.2, advantageously in the range 0.02 to 0.2 and more advantageously in the range 0.05 to 0.15. According to the invention, s is in the range 0 to 0.2; preferably, s is in the range 0.01 to 0.2 and highly preferably s is in the range 0.02 to 0.1. In accordance with the invention, the value taken by w is in the range 0 to 1, preferably in the range 0.3 to 0.5. In the dried and calcined form of the IM-20 crystalline solid of the invention, the values of q, s and w are zero.

In accordance with the invention, X is preferably selected from silicon, tin and titanium; more preferably, X is silicon, and Z is preferably selected from aluminium, boron, iron, indium and gallium; more preferably, Z is aluminium. Preferably, X is silicon: thus, the IM-20 crystalline solid of the invention, when the element Z is present, is a crystalline metallogermanosilicate with an X-ray diffraction diagram identical to that described in Table 1 when it is in its as-synthesized form and identical to that described in Table 2 when it is in its calcined form. Still more preferably, X is silicon and Z is aluminium: thus, the IM-20 crystalline solid of the invention is a crystalline aluminogermanosilicate with an X-ray diffraction diagram identical to that described in Table 1 when it is in its as-synthesized form and identical to that described in Table 2 when it is in its calcined form.

When the IM-20 crystalline solid of the invention is in its as-synthesized form, i.e. directly derived from synthesis and prior to any calcining and/or ion exchange step which is well known to the skilled person, said IM-20 solid comprises at least one organic species as described below or its decomposition products, or its precursors. In the as-synthesized form, the organic species R present in the general formula defining the IM-20 solid is (are) at least in part and preferably entirely said organic species. In accordance with a preferred embodiment of the invention, R is the 1-butyl-3-methylimidazolium cation. Said organic species R, which acts as a template, may be eliminated by conventional prior art techniques such as heat and/or chemical treatments.

The IM-20 crystalline solid of the invention is preferably a zeolitic solid.

The invention also concerns a process for preparing an IM-20 crystalline solid in which an aqueous mixture is reacted which comprises at least one source of at least one oxide of germanium, at least one source of at least one oxide $XO_2$, optionally at least one source of at least one oxide $Z_2O_3$, at least one organic species R and at least one source of fluoride ions, the mixture preferably having the following molar composition:

| | |
|---|---|
| $(XO_2 + GeO_2)/Z_2O_3$ | at least 5, preferably at least 10; |
| $H_2O/(XO_2 + GeO_2)$ | 1 to 50, preferably 5 to 20; |
| $R/(XO_2 + GeO_2)$ | 0.3 to 3, preferably 0.4 to 1.5; |
| $XO_2/GeO_2$ | 0.5 to 10, preferably 1 to 10, and highly preferably 1 to 5; |
| $F/(XO_2 + GeO_2)$ | 0.1 to 2, preferably 0.2 to 1; | where X is one or more tetravalent element(s) other than germanium, preferably selected from silicon, tin and titanium; highly preferably, X is silicon. Z is one or more trivalent element(s) selected from the group formed by the following elements: aluminium, iron, boron, indium and gallium, preferably aluminium.

In accordance with the process of the invention, R is an organic species acting as an organic template. Preferably, R is the compound 1-butyl-3-methylimidazolium.

The source of element X may be any compound comprising the element X and which can liberate that element in aqueous solution in the reactive form. Advantageously, when the element X is silicon, the source of silica may be any one of those currently used in synthesizing zeolites, for example solid powdered silica, silicic acid, colloidal silica, dissolved silica or tetraethoxysilane (TEOS). Of the powdered silicas, it is possible to use precipitated silicas, in particular those obtained by precipitation from a solution of an alkali metal silicate, such as aerosil silicas, pyrogenic silicas, for example "CAB-O-SIL", and silica gels. It is possible to use colloidal silicas having different particle sizes, for example with a mean equivalent diameter in the range 10 to 15 nm or between 40 and 50 nm, such as those sold under trade names such as "LUDOX".

The source of germanium may be any compound comprising the element germanium and which can liberate that element in aqueous solution in the reactive form. The source of germanium may be a crystalline oxide of germanium in any of its quartz or rutile forms. It is also possible to use sources of germanium such as tetraethoxygennanium or tetraisopropoxygermanium. The source of germanium may preferably be an amorphous germanium oxide, $GeO_2$.

The source of element Z may be any compound comprising the element Z which can liberate that element in aqueous solution in the reactive form. In the preferred case in which Z is aluminium, the source of alumina is preferably sodium aluminate, or an aluminium salt, for example the chloride, nitrate, hydroxide or sulphate, an aluminium alkoxide or alumina proper, preferably in the hydrated or hydratable form, such as colloidal alumina, pseudoboehmite, gamma alumina or alpha or beta trihydrate. It is also possible to use mixtures of the sources cited above.

The fluorine may be introduced in the form of alkali metal or ammonium salts, examples of which are NaF, $NH_4F$, $NH_4HF_2$, or in the form of hydrofluoric acid, or again in the form of hydrolysable compounds that can liberate fluoride anions in water, such as silicon fluoride $SiF_4$, ammonium fluorosilicate $(NH_4)_2SiF_6$ or sodium fluorosilicate $Na_2SiF_6$.

In accordance with a preferred implementation of the process of the invention, an aqueous mixture is reacted which comprises silica, optionally alumina, an oxide of germanium, 1-butyl-3-methylimidazolium and a source of fluoride ions.

The process of the invention consists of preparing an aqueous reaction mixture known as a gel and comprising at least one source of at least one oxide of germanium, at least one source of at least one oxide $XO_2$, optionally at least one source of at least one oxide $Z_2O_3$, at least one source of fluoride ions and at least one organic species R. The quantities of said reagents are adjusted in order to provide that gel with a composition which allows it to crystallize into an IM-20 crystalline solid with general formula: $mXO_2$: $nGeO_2$: $pZ_2O_3$: qR: sF: $wH_2O$, in which m, n, p, q, s and w satisfy the criteria defined above. Next, the gel undergoes a hydrothermal treatment until the IM-20 crystalline solid is formed. The gel is advantageously placed under hydrothermal conditions under autogenous reaction pressure, optionally by adding gas, for example nitrogen, at a temperature in the range 120° C. to 200° C., preferably in the range 140° C. to 180° C., and more preferably in the range 150° C. to 175° C. until solid IM-20 crystals in accordance with the invention are formed. The time necessary to obtain crystallization generally varies between 1 hour and several months, preferably between 10 hours and 20 days, depending on the composition of the reagents in the gel, stirring and the reaction temperature. The reaction is generally carried out with stirring or in the absence of stirring.

It may be advantageous to add seeds to the reaction mixture in order to reduce the time necessary for the formation of crystals and/or to reduce the total crystallization period. It may also be advantageous to use seeds to encourage the formation of IM-20 crystalline solid, to the detriment of impurities. Such seeds comprise solid crystals, preferably crystals of solid IM-20. The crystalline seeds are generally added in a proportion in the range 0.01% to 10% by weight of the mass of oxides ($XO_2$+$GeO_2$), $XO_2$ preferably being silica, used in the reaction mixture.

At the end of the reaction, the solid phase is filtered and washed; it is then ready for the subsequent steps such as drying, dehydration and calcining and/or ion exchange. For these steps, any of the conventional methods known to the skilled person may be employed.

The calcining step is advantageously implemented by means of one or more heating steps carried out at a temperature in the range 100° C. to 1000° C., for a period in the range from a few hours to several days. Preferably, in order to obtain the calcined form of the IM-20 crystalline solid of the invention, the solid in its as-synthesized form is initially heated in a stream of a neutral gas, for example a stream of nitrogen, at a temperature which is preferably in the range 100° C. to 250° C. for a period which is advantageously in the range 2 to 8 hours, then calcining in a neutral gas atmosphere, for example in a nitrogen atmosphere, at a temperature which is preferably in the range 400° C. to 700° C. for a period which is advantageously in the range 6 to 10 hours. After these first treatments, the IM-20 crystalline solid obtained is calcined at a temperature which is preferably in the range 400° C. to 700° C. for a period which is advantageously in the range 6 to 10 hours in a stream of air then for a further period, preferably in the range 6 to 10 hours, in a stream of oxygen.

The present invention also concerns the use of said IM-20 crystalline solid as an adsorbent. Preferably, said IM-20 crystalline solid is free of organic species, preferably the 1-butyl-3-methylimidazolium cation, when it is used as an adsorbent. When it is used as an adsorbent, the IM-20 crystalline solid of the invention is generally dispersed in an inorganic matrix phase which contains channels and cavities which allow the fluid to be separated to access the crystalline solid. These matrices are preferably mineral oxides, for example silicas, aluminas, silica-aluminas or clays. The matrix generally represents 2% to 25% of the mass of the adsorbent thus formed.

The invention will now be illustrated using the following examples.

Example 1

Preparation of an IM-20 Crystalline Solid of the Invention 4.335 g of 1-butyl-3-methylimidazolium hydroxide (Solvionic) was added to 9.17 ml of distilled water in a Teflon receptacle with a 20 ml internal volume. 2.330 g of germanium oxide (Aldrich) was then added to this solution. The mixture was stirred for 15 minutes using a magnetic stirrer. 2.002 g of Aerosil 200 (precipitated silica, Degussa) was then introduced. The mixture was stirred for 2 hours at ambient temperature. 1.218 ml (1.389 g) of an aqueous HF solution (40% by weight hydrofluoric acid, Riedel de Haën) was then added. The mixture was then stirred for 15 minutes. After weighing and adjusting the quantity of water required, the molar composition of the mixture obtained was: 0.6 $SiO_2$: 0.4 $GeO_2$: 0.5 1-butyl-3-methylimidazolium: 0.5 HF: 10$H_2O$.

The Teflon sleeve containing the synthesis mixture (pH~9) was then introduced into an autoclave, which was placed in an oven at 170° C. for a period of 14 days in the absence of stirring.

After filtering, the product obtained was washed several times with distilled water. It was then dried at 70° C. for 24 hours. The mass of the dry product obtained was approximately 4.23 g.

The dried solid product was initially heated in a stream of nitrogen at a temperature of 200° C. for 4 hours followed by calcining, still in a nitrogen atmosphere, at 550° C. for 8 hours. After these first treatments, the solid obtained was calcined at 550° C. for 8 hours in a stream of air then for a further 8 hours in a stream of oxygen.

Figure 2:
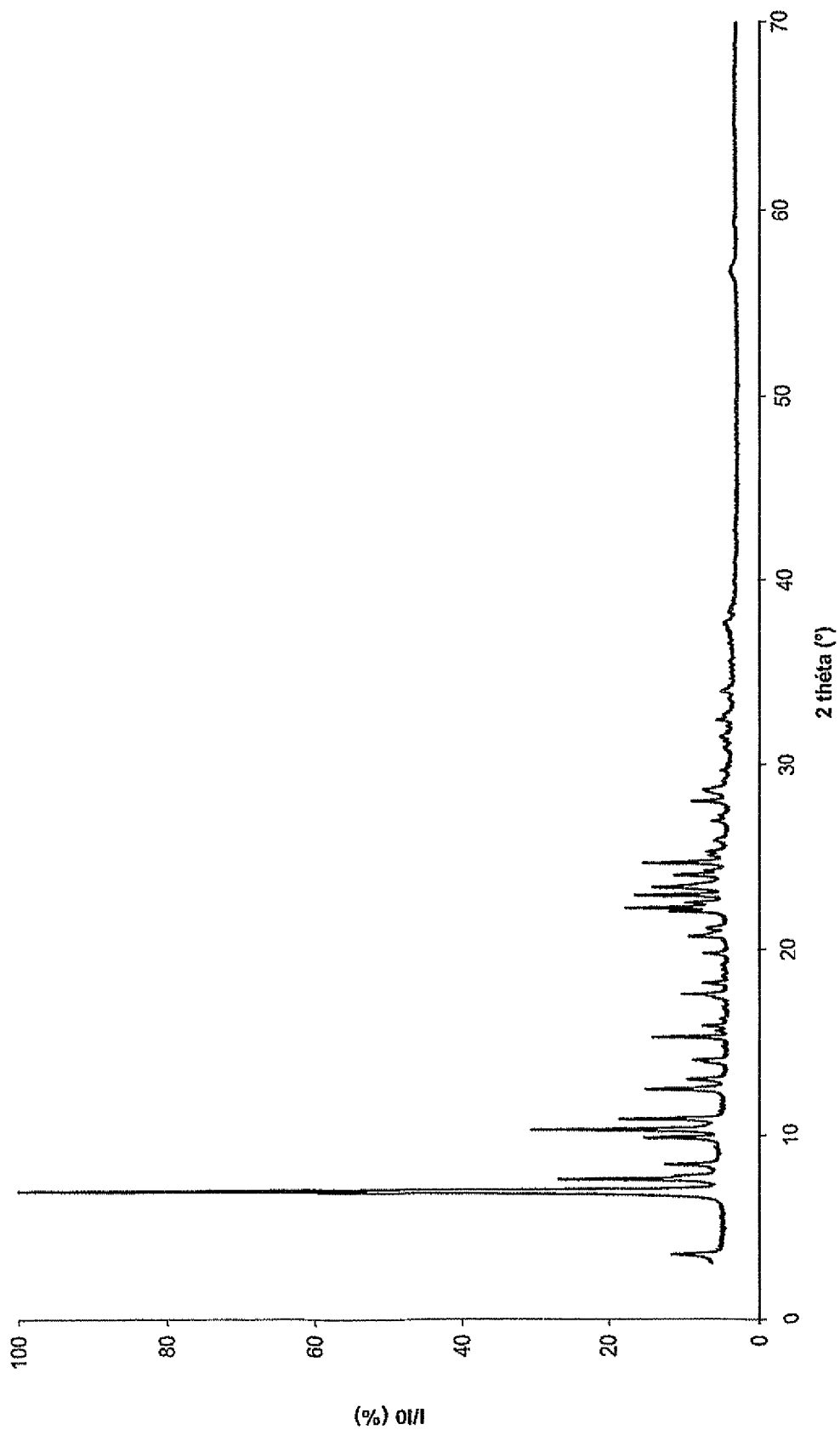

The solid obtained was analyzed by X-ray diffraction and identified as being constituted by IM-20 crystalline solid: the diffractogram produced for the calcined IM-20 solid is shown in FIG. 2.

Example 2

Preparation of an IM-20 Crystalline Solid of the Invention 3.476 g of 1-butyl-3-methylimidazolium hydroxide (Solvionic) was added to 8.30 ml of distilled water in a Teflon receptacle with a 20 ml internal volume. 1.862 g of germanium oxide (Aldrich) was then added to this solution. The mixture was stirred for 15 minutes using a magnetic stirrer. 5.945 ml (5.553 g) of TEOS (tetraethoxysilane, Aldrich) was then introduced. The mixture was stirred for 48 hours at ambient temperature in order to evaporate off the ethanol formed by hydrolysis of the TEOS. 0.975 ml (1.113 g) of an aqueous HF solution (40% by weight hydrofluoric acid, Riedel de Haën) was then added. The mixture was stirred for 15 minutes. After weighing and adjusting the quantity of water required, the molar composition of the mixture obtained was: 0.6 $SiO_2$: 0.4 $GeO_2$: 0.5 1-butyl-3-methylimidazolium: 0.5 HF: 10$H_2O$.

The Teflon sleeve containing the synthesis mixture (pH~9) was then introduced into an autoclave, which was placed in an oven at 170° C. for a period of 14 days in the absence of stirring.

After filtering, the product obtained was washed several times with distilled water. It was then dried at 70° C. for 24 hours. The mass of the dry product obtained was approximately 2.45 g.

The dried solid product was initially heated in a stream of nitrogen at a temperature of 200° C. for 4 hours followed by calcining, still in a nitrogen atmosphere, at 550° C. for 8 hours. After these first treatments, the solid obtained was calcined at 550° C. for 8 hours in a stream of air then for a further 8 hours in a stream of oxygen.

The solid obtained was analyzed by X-ray diffraction and identified as being constituted by IM-20 crystalline solid: the diffractogram produced for the calcined IM-20 solid is shown in FIG. 2.

Example 3

Preparation of an IM-20 Crystalline Solid of the Invention 6.952 g of 1-butyl-3-methylimidazolium hydroxide (Solvionic) was added to 7.64 ml of distilled water in a Teflon receptacle with a 20 ml internal volume. 0.349 g of aluminium hydroxide (63% to 67% by weight of $Al_2O_3$, Fluka) and 1.862 g of germanium oxide (Aldrich) were then added to this solution. The mixture was stirred for 1 hour using a magnetic stirrer. Approximately 0.070 g of ground product from the synthesis described in Example 1 (i.e. 2% by weight with respect to the oxides $SiO_2$ and $GeO_2$) was then introduced as seeds, and the mixture was stirred for 15 minutes. 5.945 ml (5.553 g) of TEOS (tetraethoxysilane, Aldrich) was then introduced. The mixture was stirred for 48 hours at ambient temperature in order to evaporate off the ethanol formed by hydrolysis of the TEOS. 1.952 ml (2.225 g) of aqueous HF solution (40% by weight hydrofluoric acid, Riedel de Haën) was then added and the mixture was stirred for 15 minutes. After weighing and adjusting the quantity of water required, the molar composition of the mixture obtained was: 0.6 $SiO_2$: 0.4 $GeO_2$: 0.05 $Al_2O_3$: 1 1-butyl-3-methylimidazolium: 1 HF: 10$H_2O$ (+2% by weight of seeds with respect to the oxides $SiO_2$ and $GeO_2$).

The Teflon sleeve containing the synthesis mixture (pH~9) was then introduced into an autoclave, which was placed in an oven at 170° C. for a period of 14 days in the absence of stirring.

After filtering, the product obtained was washed several times with distilled water. It was then dried at 70° C. for 24 hours. The mass of the dry product obtained was approximately 2.27 g.

The dried solid product was initially heated in a stream of nitrogen at a temperature of 200° C. for 4 hours followed by calcining, still in a nitrogen atmosphere, at 550° C. for 8 hours. After these first treatments, the solid obtained was calcined at 550° C. for 8 hours in a stream of air then for a further 8 hours in a stream of oxygen.

The solid obtained was analyzed by X-ray diffraction and identified as being constituted by IM-20 crystalline solid: the diffractogram produced for the calcined IM-20 solid is shown in FIG. 2.

Example 4

Preparation of an Adsorbent Containing the IM-20 Crystalline Solid

The solid used was the calcined solid of Example 1. It was formed into extrudates by mixing with boehmite (Dural SB3, Sasol) in a Z arm mixer and extruding the paste obtained using a piston extruder. The extrudates were then dried at 120° C. for 12 hours in air and calcined at 550° C. for 2 hours in a stream of air in a muffle furnace.

The adsorbent prepared thereby was composed of 80% by weight of IM-20 zeolitic solid and 20% by weight of alumina.

The invention claimed is:

1. An IM-20 crystalline solid having, in its calcined form, an X ray diffraction diagram including at least the peaks shown in the table below:

| 2 theta (°) | $d_{hkl}$ (Å) | $I/I_0$ |
| --- | --- | --- |
| 3.49 | 25.27 | Vw |
| 6.95 | 12.72 | Vs |
| 7.02 | 12.59 | S |
| 7.63 | 11.58 | W |
| 7.79 | 11.34 | Vw |
| 8.38 | 10.54 | Vw |
| 9.87 | 8.95 | Vw |
| 10.32 | 8.56 | W |

-continued

| 2 theta (°) | $d_{hkl}$ (Å) | $I/I_0$ |
|---|---|---|
| 10.90 | 8.11 | W |
| 12.47 | 7.09 | Vw |
| 12.98 | 6.81 | Vw |
| 13.91 | 6.36 | Vw |
| 14.05 | 6.30 | Vw |
| 15.27 | 5.80 | Vw |
| 15.89 | 5.57 | Vw |
| 17.59 | 5.04 | Vw |
| 18.21 | 4.87 | Vw |
| 19.82 | 4.48 | Vw |
| 20.70 | 4.29 | Vw |
| 21.15 | 4.20 | Vw |
| 22.10 | 4.02 | Vw |
| 22.32 | 3.98 | W |
| 22.57 | 3.94 | Vw |
| 22.99 | 3.86 | Vw |
| 23.39 | 3.80 | Vw |
| 24.05 | 3.70 | Vw |
| 24.30 | 3.66 | Vw |
| 24.70 | 3.60 | Vw |
| 25.10 | 3.54 | Vw |
| 25.30 | 3.52 | Vw |
| 28.05 | 3.18 | Vw |
| 28.67 | 3.11 | vw | in which: Vs=very strong; S=strong; M=medium; Mw=medium weak; W=weak; Vw=very weak, and having a chemical composition expressed by the following general formula: $mXO_2$: $nGeO_2$: $pZ_2O_3$: qR: sF: $wH_2O$, in which R represents one or more organic species, X represents one or more tetravalent element(s) other than germanium, Z represents at least one trivalent element and F is fluorine, m, n, p, q, s and w respectively representing the number of moles of $XO_2$, $GeO_2$, $Z_2O_3$, R, F and $H_2O$ and m is in the range 0.3 to 0.8, n is in the range 0.2 to 0.7, p is in the range 0 to 0.1, q is in the range 0 to 0.2, s is in the range 0 to 0.2 and w is in the range 0 to 1.

2. An IM-20 crystalline solid according to claim 1, in which X is silicon.

3. An IM-20 crystalline solid according to claim 1, in which Z is aluminium.

4. An IM-20 crystalline solid according to claim 1, in which the molar ratio {(n+m)/p} is 10 or more, p is in the range 0.005 to 0.02, q is in the range 0 to 0.2, s is in the range 0 to 0.2 and w is in the range 0 to 1.

5. A process for preparing an IM-20 crystalline solid according to claim 1, consisting of mixing, in an aqueous medium, at least one source of at least one oxide of germanium, at least one source of at least one oxide $XO_2$, optionally at least one source of at least one oxide $Z_2O_3$, at least one source of fluoride ions and at least one organic species R, then carrying out hydrothermal treatment of said mixture until said IM-20 crystalline solid is formed.

6. In an adsorption process using a crystalline solid, the improvement wherein the solid is an IM-20 crystalline solid according to claim 1.

7. A process for preparing an IM-20 crystalline solid according to claim 5, in which the molar composition of the reaction mixture is such that:

| | |
|---|---|
| $(XO_2 + GeO_2)/Z_2O_3$: | at least 5; |
| $H_2O/(XO_2 + GeO_2)$: | 1 to 50; |
| $R/(XO_2 + GeO_2)$: | 0.3 to 3; |
| $XO_2/GeO_2$: | 0.5 to 10; |
| $F/(XO_2 + GeO_2)$: | 0.1 to 2. |

8. A preparation process according to claim 5, in which said organic species R is the 1-butyl-3-methylimidazolium cation.

9. A preparation process according to claim 5, in which the reaction mixture is supplemented with seeds.

10. In an adsorption process using a crystalline solid, the improvement wherein the solid is an IM-20 crystalline solid prepared by a process according to claim 5.

* * * * *

UNITED STATES PATENT AND TRADEMARK OFFICE
CERTIFICATE OF CORRECTION

PATENT NO. : 8,444,952 B2
APPLICATION NO. : 13/140501
DATED : May 21, 2013
INVENTOR(S) : Dodin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 48 days.

Signed and Sealed this
Eighth Day of September, 2015

Michelle K. Lee
*Director of the United States Patent and Trademark Office*